United States Patent [19]

Cattini

[11] Patent Number: 5,217,203
[45] Date of Patent: Jun. 8, 1993

[54] VALVULAR DEVICE FOR THE DRAWING OF COMPRESSED AIR FROM A STATIONARY TANK THROUGH A MOBILE UNIT

[75] Inventor: Flavio Cattini, Bergamo, Italy

[73] Assignee: FK Arna S.r.l., Bergamo, Italy

[21] Appl. No.: 816,952

[22] Filed: Jan. 3, 1992

[30] Foreign Application Priority Data

Apr. 3, 1991 [IT] Italy .............................. 000037 A/91

[51] Int. Cl.$^5$ ............................................. F16L 29/02
[52] U.S. Cl. .................. 251/149.6; 251/149.1
[58] Field of Search ................. 251/149, 149.1, 149.3, 251/149.6, 149.7; 137/614, 614.02, 614.03, 614.05

[56] References Cited

U.S. PATENT DOCUMENTS

| 3,477,105 | 11/1969 | Cranage | 251/149.1 X |
| 3,563,267 | 2/1971 | Thompson | 251/149.6 X |
| 3,687,161 | 8/1972 | Grguric et al. | 137/614.02 X |

FOREIGN PATENT DOCUMENTS

| 1130655 | 5/1962 | Fed. Rep. of Germany . |
| 1468208 | 2/1967 | France . |
| 2649777 | 1/1991 | France . |
| 364992 | 11/1962 | Switzerland . |
| 1561285 | 2/1980 | United Kingdom . |

Primary Examiner—Martin P. Schwadron
Assistant Examiner—Kevin L. Lee
Attorney, Agent, or Firm—McGlew and Tuttle

[57] ABSTRACT

The invention regards a valvular device for the drawing of compressed air from a stationary tank through a mobile unit. The device has a fixed part 12 connected to the compressed air tank 10 with a coupling pipe union 14 and an inlet valve 16 for the air from the tank to the pipe union 15. The device also has a mobile part 13 on a mobile unit with a drawing nose 21 which is inserted into the pipe union 14 for the drawing of the air to be utilized.

10 Claims, 2 Drawing Sheets

VALVULAR DEVICE FOR THE DRAWING OF COMPRESSED AIR FROM A STATIONARY TANK THROUGH A MOBILE UNIT

FIELD OF THE INVENTION

The present invention relates to a valvular device for the drawing of compressed air from a stationary tank through a mobile unit. It is particularly and advantageously applied to automatic fabric spreaders.

BACKGROUND OF THE INVENTION

These spreaders usually have a mobile unit or carriage onto which equipment using compressed air coming from a fixed compressor tank can be arranged. Up till now the compressed air has gone from the fixed tank and fed into similar equipment through spiral or helical pipes which follow the movements of the mobile carriage and, therefore, must be of an appropriate, thus notable, length. This is counterproductive and leads to inconveniences and impediments as operators well know.

SUMMARY AND OBJECT OF THE INVENTION

The present invention aims to solve this problem with a drawing device which uses compressed air from a stationary tank without the need of flexible pipes and, therefore, without running into the above mentioned inconveniences.

The main object of the invention is to provide a valvular device with a fixed part connected to the stationary air tank and with another part that moves with the equipment to be fed. This another part is on a mobile unit and couples itself with the fixed part when it draws and uses the air in the tank, in other words when it uses the equipment.

The valvular device is a valved connection having a first part and a second part. The first part has a coupling pipe union for connecting with a drawing nose of the second part. The connection between the pipe union and the drawing nose is such that a flow of fluid can pass between the pipe union and the drawing nose. A valve means is also included in the first part and this valve means passes or obstructs the flow of fluid in the pipe union. The valve means has a deflector control member movable between a first position obstructing the flow of fluid and a second position passing the flow of fluid. The second part has an actuator stem means for coming into contact with the deflection control member and moving the deflection control member from the first position to the second position when the drawing nose is connecting with the coupling pipe union. In this way the valve can be controlled to only pass fluid through the pipe union when the drawing nose is connected to the pipe union.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
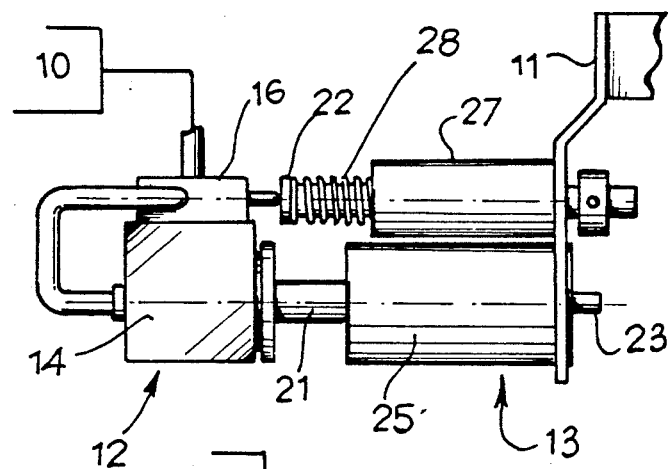
FIGS. 1 and 2 are lateral views of the valvular device respectively in a coupled position for the drawing of compressed air and in a disengaged position.

The drawings show a compressed air or storage tank 10 in a stationary position and a section of the mobile unit 11 such as a carriage for automatic fabric spreaders which moves on a spreading table.

The valvular device of the present invention has a fixed or first part 12 which is aligned to a mobile part 13. The fixed part 12 can be constrained to the table of the automatic spreader and is made from a coupling pipe union 14 which connects to a compressed air tank 10 through a conduit 15 into which a valve means 16 is inserted for passing and obstructing fluid flow through the coupling pipe union 14. The pipe union 14 has a seat 17 which is open towards the mobile part 13 of the device and is fitted with a countersunk mouth-piece 18 and with an internal seal means 19. A floating washer 20 can also be provided in the seat 17. The valve means 16 has a deflection control member or means 16a also turned towards the mobile part 13 of the device and the deflection control member 16a is designed to open/close the valve means 16 when the deflection control member 16a is moved.

The mobile part 13 of the device is assembled onto the mobile unit or carriage 11 and has a drawing nose 21 aligned to and insertable in the seat 17 of the coupling pipe union 14 and an actuator stem means 22 in line to and for interacting with, and moving, the control member 16a of the valve 16.

The drawing nose 21 is of an extended tubular shape. It has a longitudinal hole 21a to the back of which a conduit 23 is jointed. The conduit 23 delivers the compressed air to the equipment to be fed on the mobile unit through a nonreturn valve (not shown). The drawing nose 21 is fitted with an advantageously spherically-shaped head means 24 guided in a pipe coupling 25 in order to allow for both axial and oscillating movements of the nose so as to facilitate its coupling to the pipe union. The drawing nose 21 is also stressed by a spring 26 through the head 24. The spring normally pushing or biasing the drawing nose 21 and keeping it moved forward or extended.

The actuator stem means 22 is axially guided and movable in a bushing 27 and is stressed by a shock absorber spring 28 which normally pushes it in the same direction to which the drawing nose 21 is pushed by the respective spring 26.

Figure 2:
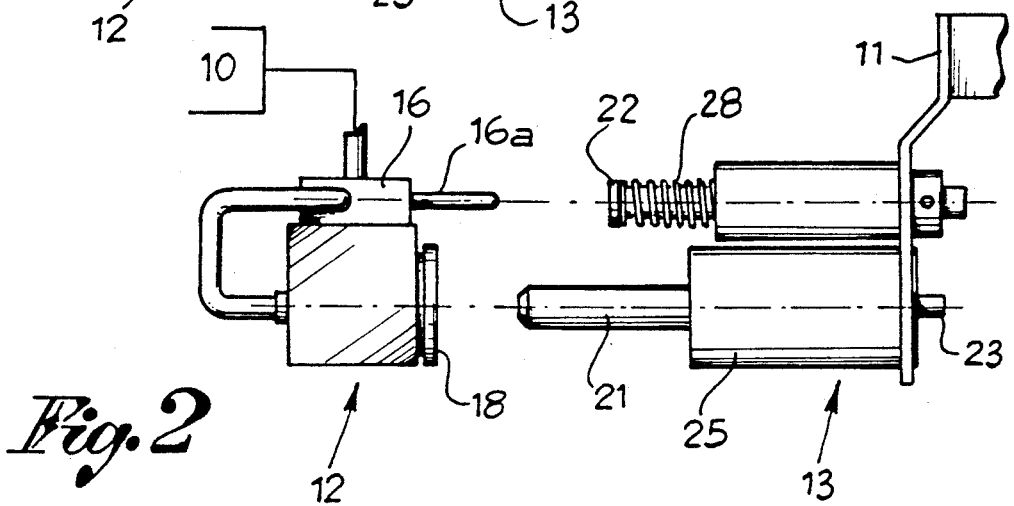
Figure 3:
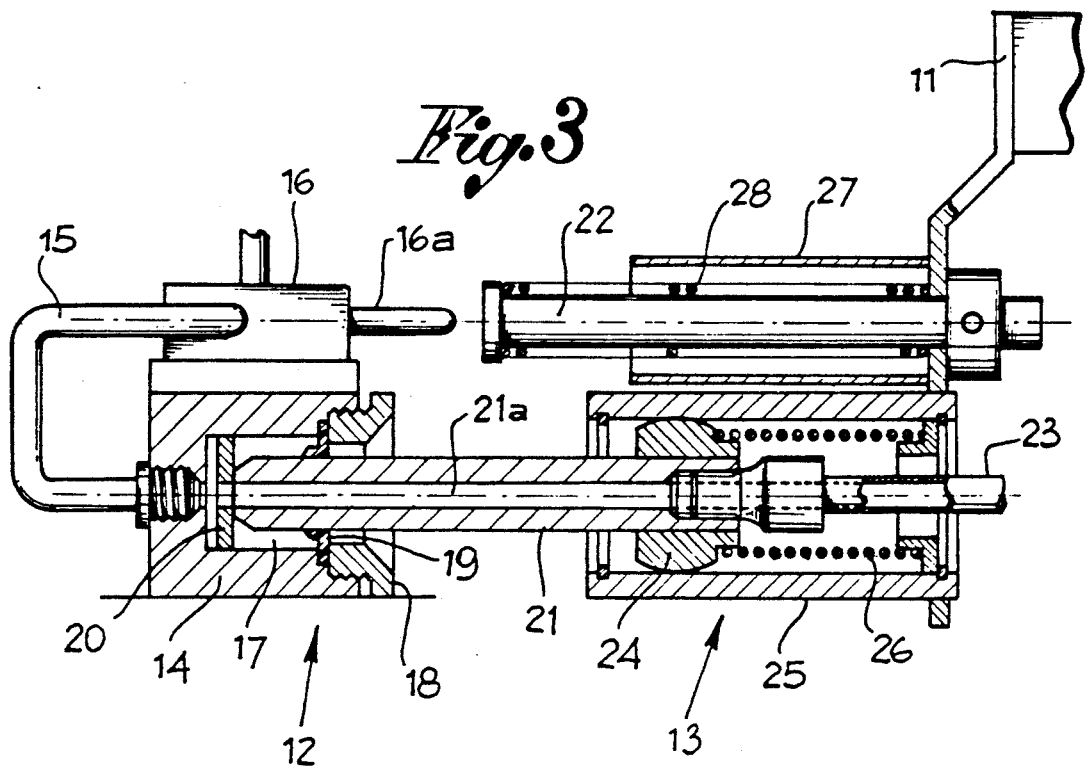
FIG. 3 is a longitudinal section of the device in a partially coupled position for the air intake.
Figure 4:
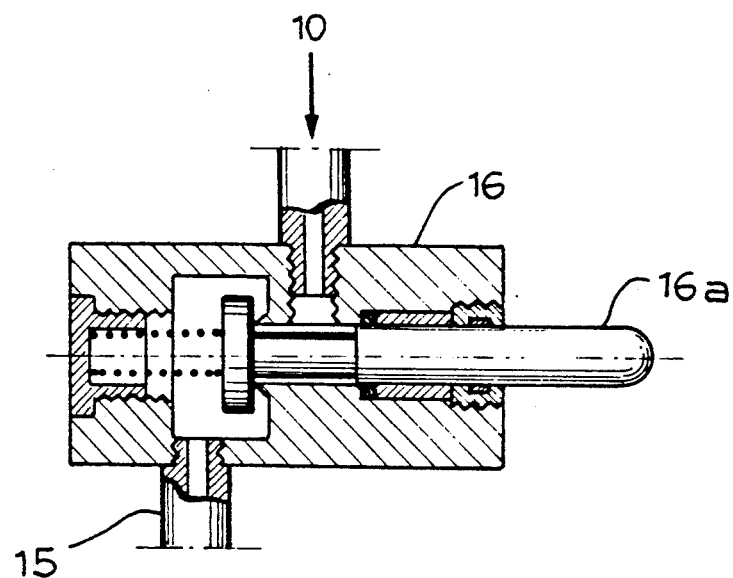
FIG. 4 is a cross sectional view of a preferred embodiment of the valve.

In practice, the fixed part 12 of the valvular device always remains still in the same way to the compressed air tank 10 to which it is connected. The mobile part 13 follows the unit or carriage 11 which carries it (FIG. 1). So, when the carriage moves towards the fixed part (FIG. 2) the drawing nose 21 couples to the pipe union 14 resting against a possible washer 20 whilst the internal seal 19 secures the coupling. The spring 26 of the drawing nose deadens or softens the pushes or shocks following the coupling and helps to keep the nose in a correct position in respect to the pipe union 14. On the other side, the stem 22 (FIG. 3) rests against the control member 16a of the valve 16 causing its opening. This opening causes the passing of compressed air from the tank 10 towards its utilization through the conduits formed by the valve itself. The air is carried by the conduit 15 which connects the valve to the pipe union 14, by the drawing nose 21 and by the conduit 23 connected to it. This obviously allows for the feeding and activating of the compressed air equipment each time the mobile unit reaches a particular position and allows for the interrupting of delivery as soon as the mobile unit moves away from such a position.

Modifications can however be made to the above described valvular device but still remain in accordance with the invention. By way of example, the valve 16 can be incorporated in a part of the device, more precisely in the pipe union, and be directly or indirectly controlled by the drawing nose for its opening/closing. In this case it will be possible to eliminate the actuator stem without alternating the function of the device.

Alternatively, it is possible to use a solenoid valve coordinated to stop sensors for the opening/closing of the air to the drawing nose without having to mechanically intervene on the valve itself through the stem or with the same drawing nose as described above.

While specific embodiments of the invention have been shown and described in detail to illustrate the application of the principles of the invention, it will be understood that the invention may be embodied otherwise without departing from such principles.

I claim:

1. A valve connection device comprising:
   a first part including a coupling pipe union and a valve means for passing the obstruction a flow of fluid through said pipe union, said valve means including a deflection control member movable between a first position obstructing said flow of said fluid and a second position passing said flow of said fluid; and
   a second part connectable to said first part and including a drawing nose substantially aligned with said couping pipe union, said drawing nose having means for connecting with said couping pipe union and transferring said flow of said fluid between said coupling pipe union and said drawing nose when said first and second parts are adjacent, said second part also including an actuator stem means extending from said second part and for moving said deflection control member from said first position to said second position when said drawing nose is connecting with said coupling pipe union.

2. A device as claimed in claim 1, wherein: said coupling pipe union has a seat with a countersunk mouthpiece and an internal seal means for seal coupling to said drawing nose.

3. A device in accordance with claim 2, further comprising:
   a floating washer positioned in said seat of said couping pipe union and also positioned against said drawing nose when said drawing nose is connected to said coupling pipe union.

4. A device in accordance with claim 1, wherein:
   said second part also includes means for axially moving said drawing nose in a guided pipe coupling between a first position extending at a maximum away from said guided pipe and a second position withdrawn into said guided pipe, said means for moving said drawing nose also including means for biasing said drawing nose in said first position.

5. A device in accordance with claim 4, wherein:
   said drawing nose includes a spherical head means for moving said drawing nose in pivotal movement about said spherical head means.

6. A device in accordance with claim 1, wherein:
   said deflection control member is biased in said first position.

7. A device in accordance with claim 1, wherein:
   said actuator stem means includes a spring means for biasing said actuator stem means in an extended position and for receiving said actuator stem means in a retracted position after said actuator stem means moves said deflection control memeber into said second position.

8. A device in accordance with claim 1, wherein:
   said first part is substantially stationary;
   said valve means obstructs and passes said flow of fluid between said coupling pipe union and a storage tank;
   said second part is mounted on a mobile unit; and
   said drawing nose is connected to a conduit of said mobile unit and passes said flow of fluid between said drawing nose and a utilization on said module unit.

9. A device as claimed in claim 1, wherein: said valve means is incorporated in the coupling pipe union.

10. A device as claimed in claim 1, wherein: the valve means includes a solenoid valve, and said second part has checking means for control of said solenoid valve.

* * * * *